United States Patent [19]

Bronold

[11] Patent Number: 4,627,059
[45] Date of Patent: Dec. 2, 1986

[54] CIRCUIT ARRANGEMENT FOR TELECOMMUNICATIONS SYSTEMS, PARTICULARLY TELEPHONE SWITCHING SYSTEMS, HAVING DATA PROTECTION BY WAY OF PARITY BITS

[75] Inventor: Josef Bronold, Germering, Fed. Rep. of Germany

[73] Assignee: Siemens Aktiengesellschaft, Berlin and Munich, Fed. Rep. of Germany

[21] Appl. No.: 632,475

[22] Filed: Jul. 19, 1984

[30] Foreign Application Priority Data

Aug. 10, 1983 [DE] Fed. Rep. of Germany ....... 3328893

[51] Int. Cl.⁴ ............................................. G06F 11/10
[52] U.S. Cl. ...................................................... 371/51
[58] Field of Search ............................. 371/51, 49, 50; 364/200, 900

[56] References Cited

U.S. PATENT DOCUMENTS

| | | | |
|---|---|---|---|
| 4,020,459 | 4/1977 | Coomer | 340/146.1 |
| 4,360,917 | 11/1982 | Sindelar et al. | 371/49 |
| 4,429,391 | 1/1984 | Lee | 371/49 |
| 4,528,665 | 7/1985 | Burns | 371/51 |
| 4,528,666 | 7/1985 | Cline | 371/51 |

FOREIGN PATENT DOCUMENTS

83/00242 1/1983 PCT Int'l Appl. .

OTHER PUBLICATIONS

Rowe H. L., "Parity on Bidirectional Microprocessor Bus", IBM Technical Disclosure Bulletin, vol. 21, No. 1, Jun. 1978, pp. 377-378.

Primary Examiner—Michael R. Fleming
Attorney, Agent, or Firm—Hill, Van Santen, Steadman & Simpson

[57] ABSTRACT

A dynamic memory system is connected to a data bus via a buffer. A parity evaluator is provided for monitoring air-free storage and is also connected to the data bus, the parity evaluator supplying a first parity bit to the memory upon storage of information incoming from the data bus and from a second parity bit upon emission of stored information and transmission thereof via the data bus, the parity evaluator comparing the second parity bit to the first parity bit.

4 Claims, 1 Drawing Figure

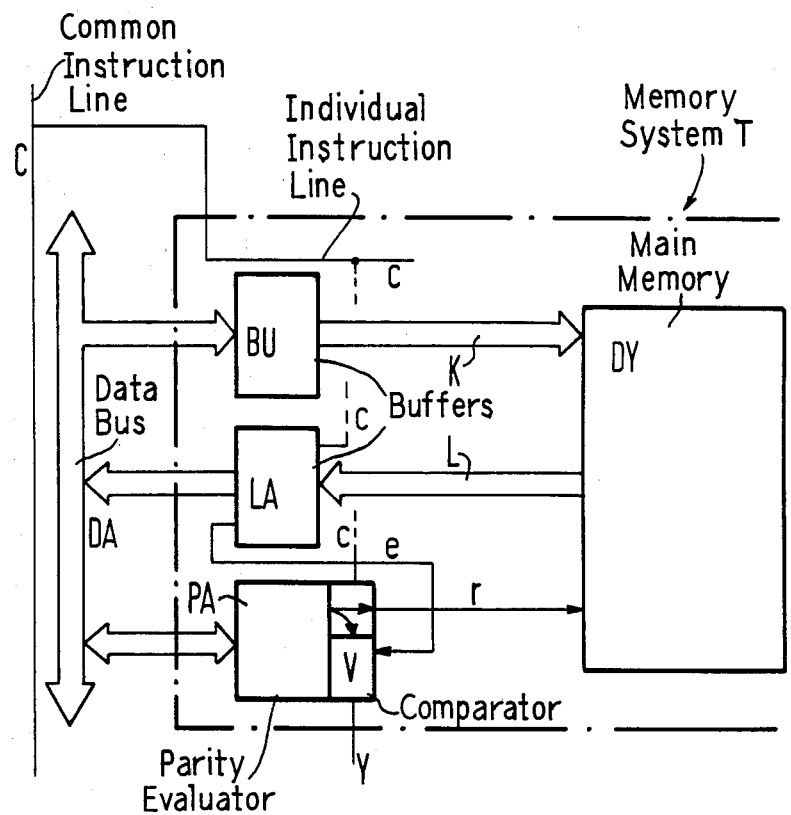

4,627,059

CIRCUIT ARRANGEMENT FOR TELECOMMUNICATIONS SYSTEMS, PARTICULARLY TELEPHONE SWITCHING SYSTEMS, HAVING DATA PROTECTION BY WAY OF PARITY BITS

BACKGROUND OF THE INVENTION

1. Field of the Invention

The present invention relates to a circuit arrangement for telecommunications systems, and more particularly for telephone systems, wherein information incoming via a data bus and comprising a plurality of bits, particularly of a byte, together with a write instruction via a first buffer serving for intermediate storage of respectively only one information are supplied to a main memory system serving for storage of a plurality of information at the same time. The main memory systems comprises, in particular, a dynamic memory portion, an information taken from the main memory system by way of a read instruction and offered by the main memory system chronologically limited are emitted onto the data bus via a second buffer until the end of the read instruction. Given storage of the incoming information by way of a parity evaluator, respectively one parity bit per information is formed and stored together with the respective information and, given output of a respective information from the main memory system, one parity bit per information is again derived from the information and is compared to the stored parity bit.

2. Description of the Prior Art

It has been provided in prior instances of circuit arrangements of the general type set forth above, that a parity evaluator between the first buffer and the main memory system is also connected to an internal memory data bus connecting the buffer and the main memory system. When the information transmitted to the main memory system via the buffer and via the data bus are accompanied by a respective parity bit, then the accuracy of not only the information transmission via the data bus, but also the intermediate storage in the first buffer can be co-monitored.

It turns out, however, that the monitoring of the accuracy of the storage is of considerably greater significance than a monitoring of the accuracy of the transmission of the information via the data bus.

A problem in circuit arrangements of the type set forth above is the total expenditure for the large number of memory processes to be executed. The time expense required for the subsequent parity evaluation is thereby added per storage process to the time of intermediate storage in the first buffer. Since the result of the parity evaluation must also be stored, namely assigned to the respective information, the time expense for the parity evaluation is interposed between the time of the intermediate storage in the first buffer and the acceptance of the appertaining information in the main memory system.

SUMMARY OF THE INVENTION

In view of the foregoing, a particular object of the invention is to increase the overall speed of the switching operations from the information transmission via the initially-mentioned data bus up to the completion of storage in the main memory system in a circuit arrangement of the type generally set forth.

A further interrelationship is essential for the present invention. As initially mentioned, the invention proceeds on the basis that the information taken from the main memory system by way of a read instruction are respectively offered by the main memory system only with a time limitation, for which reason the second buffer, over which each of these respective information are transmitted until the end of the read instruction, is provided. This involves a time problem for the parity evaluator which additionally needs another timing mark given receipt of an information from the main memory system, the timing mark indicating for the parity evaluator when the information output by the main memory system is to be accepted as valid. It is therefore also an object of the invention to simplify the acquisition of information for the parity evaluator, the information being output from the main memory system and forwarded for transmission via the initially-mentioned data bus. These objects are achieved, according to the invention, in that the parity evaluator is connected to the data bus parallel to the buffers and receives both incoming and transmitted information via the data bus, and in that the parity evaluator, upon transmission of an information, likewise receives the stored parity bit which has been extracted from the transmission via the second buffer.

As a result of connecting the parity evaluators to the data bus, the parity evaluator acquires both information incoming via the data bus and information forwarded thereover for transmission. The acceptance of an information incoming via the data bus into, on the one hand, the buffer and, on the other hand, by the parity evaluator begin simultaneously. As a result thereof, the parity evaluator can offer its parity bit which is to be additionally stored in the main memory system with the respectively arrived information at an earlier point in time. Given the transmission of information from the main memory system via the second buffer and the data bus, the parity evaluator accepts the respective information via the second buffer which emits information onto the data bus up to the end of the respective read instruction. Therewith, the time considerations for the parity evaluator with respect to the acceptance of information output by the main memory system via the data bus are rendered completely uncritical. The end of the respective read instruction can be employed as a timing mark for the parity evaluator; therefore, a separate timing mark is not required.

BRIEF DESCRIPTION OF THE DRAWING

Other objects, features and advantages of the invention, its organization, construction and operation will be best understood from the following detailed description, taken in conjunction with the accompanying drawing, on which there is a single figure, in block diagram form, of memory systems constructed and operating in accordance with the present invention.

DESCRIPTION OF THE PREFERRED EMBODIMENTS

Referring to the drawing, a plurality of main memory systems, of which only one main memory system T is illustrated, are connected to a data bus DA which may be assumed to be connected to an information-processing device. Information from the information-processing device can arrive via the data bus DA, or such information can also be output to the information-processing device. These operations are controlled by the information-processing device. The information have a uniform data format. Each information comprises a total of 8 bits, thus of 1 byte. An information can also comprise half a byte or a plurality of bytes. The transmission of the individual bits of an information can occur in space-division multiplex or in time-division multiplex, or in a mixture of these techniques.

The information are emitted by the information-processing device to each individual main memory system together with a write instruction or, respectively, a fetched from each individual main memory system with a read instruction. The write instruction or, respectively, read instruction not only identifies these two different operations, but also respectively identifies the individual main memory system at which the respective write operation (storage) or read operation (removal from the main memory system) is to be executed. A write instruction, a read instruction and addressing of the individual main memory system are accomplished via a common instruction line C which is extended into every main memory system having instruction line c individually associated with each main memory system. An information to be stored is first supplied to a first buffer BU. The write instruction designates that the appertaining main memory system, for example the system T, is intended and that it is to accept an information from the data bus DA. The buffer BU is thereby initiated to accept the information available on the data bus DA.

The write instruction also proceeds over the instruction line c to a parity evaluator PA. Simultaneously with the buffer BU, the parity evaluator PA is initiated to accept the information offered via the data bus DA. In a known manner, the parity evaluator PA forms a checksum from the individual components of the accepted information and forwards a corresponding parity bit to the main memory DY via a line r. This parity bit always have the value "1" when the checksum is even. When the checksum is odd, then the parity bit has the value "0". An uneven value therefore always occurs together with the checksum, i.e. given addition of the checksum and the parity bit.

The arrived information which has been intermediately stored in the buffer BU is forwarded via the internal data bus K to a dynamic main memory DY. It is stored therein in the memory element of the main memory system together with the assigned parity bit.

The main memory DY can be a matter of a first infirst out (FIFO) memory, wherefrom, therefore, the information are in turn taken in the same sequence in which they were stored. The main memory, however, can also be a matter of a memory in which the individual information are stored together with addresses or are stored with the assistance of addressing. Possible as a result thereof, given an individual removal of these information of the main memory, is to select designationally-defined memory elements of the main memory and to respectively take a specific information from the totality of stored information from the main memory system on the basis of an address.

Information are taken in turn from the main memory DY with the assistance of a read instruction. These information proceed, via an internal data path L to a second buffer LA. The information offered by the main memory on the basis of a read instruction communicated to the main memory system are only offered with a respective time restriction. They are therefore first transmitted to the second buffer LA and intermediately stored therein. In addition to the respectively taken information, this memory content also encompasses the parity bit stored together with the information. Whereas the information is output onto the data bus DA on the basis of the read instruction, the parity bit stored in the meantime remains within the memory unit T; it proceeds via a line e to the parity evaluator PA. Within the parity evaluator, the intermediately stored parity bit proceeds to a comparator V. The parity evaluator receives the information emitted onto the data bus DA by the second buffer LA from the data bus and undertakes a parity evaluation. The result of this parity evaluation is likewise internally supplied by the parity evaluator to the comparator V. When the comparator identifies coincidence, then it derives therefrom that the operation of storage in the main memory DY as well as the taking of the appertaining information from the main memory and the operation of the intermediate storage in the first buffer BU and the operation of intermediate storage in the second buffer LA have proceeded without error. When, however, the two parity bits are unequal, this being perceived by the comparator V, then the latter emits an alarm signal via a line Y. It is thereby indicated that the various operations of storage and intermediate storage have not proceeded without error.

As has been explained, a read instruction is supplied via the instruction line c to, among other, the parity evaluator PA. It is provided that the end of each read instruction is a signal for the parity evaluator upon removal of an information from the main memory DY that the parity evaluation to be executed in conjunction therewith is to occur, as is the comparison with the assistance of the comparator V.

The emission of an information taken from the main memory DY, the information having been intermediately stored in the second buffer LA, occurs by the end of the read instruction transmitted via the instruction lines C, c. To this end, the second buffer LA is also connected to the individual instruction lines c.

In a departure from that described above, it can also be provided that the parity evaluator emits unequal parity bits as a function of the difference between the operation of arrival and the operation of emission of information, emitting the unequal parity bits, on the one hand, upon storage of information having even-numbered or, respectively, odd-numbered checksum and, on the other hand, upon emission of information having even-numbered or, respectively, odd-numbered checksum, and that a comparison of parity bits of identical content leads to the formation of an alarm signal via the line Y and a comparison of parity bits not identical in content leads to the formation of a positive statement or to the prevention of the formation of an alarm signal. To this end, therefore, the parity evaluator PA reacts differently upon receipt of a write instruction, on the one hand, and upon receipt of a read instruction, on the other hand. The effect thereof is that the parity evaluator always forms unequal parity bits given, on the one hand, storage of an information and, on the other hand, removal of the same information from the main memory system. In this case, a comparator therefore perceives the accuracy of all storage operations on the basis that the two appertaining parity bits are unequal. Additionally achieved as a result thereof is that the parity evaluator PA is always subjected to a self-monitoring.

Although I have described my invention by reference to particular illustrative embodiment thereof, many changes and modifications of the invention may become apparent to those skilled in the art without departing from the spirit and scope of the invention. I therefore intend to include in the patent warranted hereon all such changes and modifications as may reasonably and properly be included within the scope of my contribution to the art.

I claim:

1. In a circuit arrangement of the type in which a dynamic memory for storing a plurality of informations is connected to a data bus via a first buffer which receives and stores a multibit information and stores the same in the dynamic memory upon receipt of a write instruction and is connected to the data bus via a second buffer and emits information thereto in a chronologically limited manner upon receipt of and only for the duration of a read instruction, the improvement wherein:

said second buffer includes a parity bit output; and a parity evaluator is provided and forms a first parity bit and stores the same with the information in the dynamic memory for each incoming information in the first buffer, said parity evaluator derives a second parity bit upon reading of an information from the dynamic memory and comprises comparison means for comparing the first and second parity bits for equality, said parity evaluator connected to the data bus in parallel with the first and second buffers to receive both incoming and outgoing information at the respective times of receipt and transmission and is connected to said parity bit output of the second buffer for receiving the second parity bit upon intermediate storage in the second buffer, whereby, upon each emission of an information, the comparison means of said parity evaluator receives, on the one hand, the second parity bit derived by the parity evaluator and, on the other hand, the first parity bit correspondingly stored in the dynamic memory and output therefrom to the second buffer with the information, and extracted at said parity bit output of the second buffer.

2. The improved circuit arrangement of claim 1, wherein:

said parity evaluator comprises means for comparing the first and second parity bits in response to the end of a read instruction.

3. The improved circuit arrangement of claim 1, wherein:

said parity evaluator comprises incoming and outgoing information receiving means for emitting unequal parity bits as a function of the difference between the operation of arrival and the operation of emission upon storage of information having a selected even-numbered or odd-numbered checksum and upon the emission of information having a selected even-numbered or odd-numbered checksum; and means responsive to the comparison of parity bits to control the generation of an indicator signal.

4. The improved circuit arrangement of claim 3, wherein:

the last-mentioned means includes means responsive to unequal parity bits to produce an alarm signal.

* * * * *